United States Patent
Sakai

(10) Patent No.: US 8,614,682 B2
(45) Date of Patent: Dec. 24, 2013

(54) TOUCHSCREEN PANEL UNIT, SCROLLING CONTROL METHOD, AND RECORDING MEDIUM

(75) Inventor: Toshihiko Sakai, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 415 days.

(21) Appl. No.: 12/843,227

(22) Filed: Jul. 26, 2010

(65) Prior Publication Data

US 2011/0025627 A1 Feb. 3, 2011

(30) Foreign Application Priority Data

Jul. 30, 2009 (JP) .................................. 2009-178381

(51) Int. Cl.
*G06F 3/041* (2006.01)
*G06F 3/048* (2013.01)
*G09G 5/00* (2006.01)

(52) U.S. Cl.
USPC ............ 345/173; 345/156; 345/157; 715/784

(58) Field of Classification Search
USPC ................. 345/156–159, 162, 173–179, 684; 178/18.01; 715/784–787, 830
See application file for complete search history.

(56) References Cited

U.S. PATENT DOCUMENTS

| 7,576,732 | B2 | 8/2009 | Lii | |
|---|---|---|---|---|
| 2006/0290678 | A1* | 12/2006 | Lii | 345/173 |
| 2007/0188458 | A1* | 8/2007 | Bells et al. | 345/167 |
| 2008/0001927 | A1* | 1/2008 | Yoshida | 345/173 |
| 2008/0062207 | A1* | 3/2008 | Park | 345/684 |
| 2008/0174567 | A1* | 7/2008 | Woolley et al. | 345/173 |
| 2010/0328227 | A1* | 12/2010 | Matejka et al. | 345/173 |

FOREIGN PATENT DOCUMENTS

| JP | 05-027744 | 2/1993 |
|---|---|---|
| JP | 2001-306247 | 11/2001 |
| JP | 2003-099205 | 4/2003 |
| JP | 2007-004762 | 1/2007 |
| JP | 2007-080291 | 3/2007 |
| JP | 2007-279638 | 10/2007 |

* cited by examiner

*Primary Examiner* — Kenneth Bukowski
(74) *Attorney, Agent, or Firm* — IPUSA, PLLC

(57) ABSTRACT

A touchscreen panel unit includes a scrolling determination part configured to determine whether to scroll a displayable region of information to be displayed on a screen based on the positional relationship between the position of a first contact with the screen and the position of a second contact with the screen; a scrolling setting part configured to set the scrolling direction and the scrolling distance of the displayable region based on the position of the first contact and a contact position path starting at the position of the second contact, in response to the scrolling determination part determining that the displayable region is to be scrolled; and a scrolling information output part configured to output information indicating the scrolling direction and the scrolling distance set by the scrolling setting part.

7 Claims, 10 Drawing Sheets

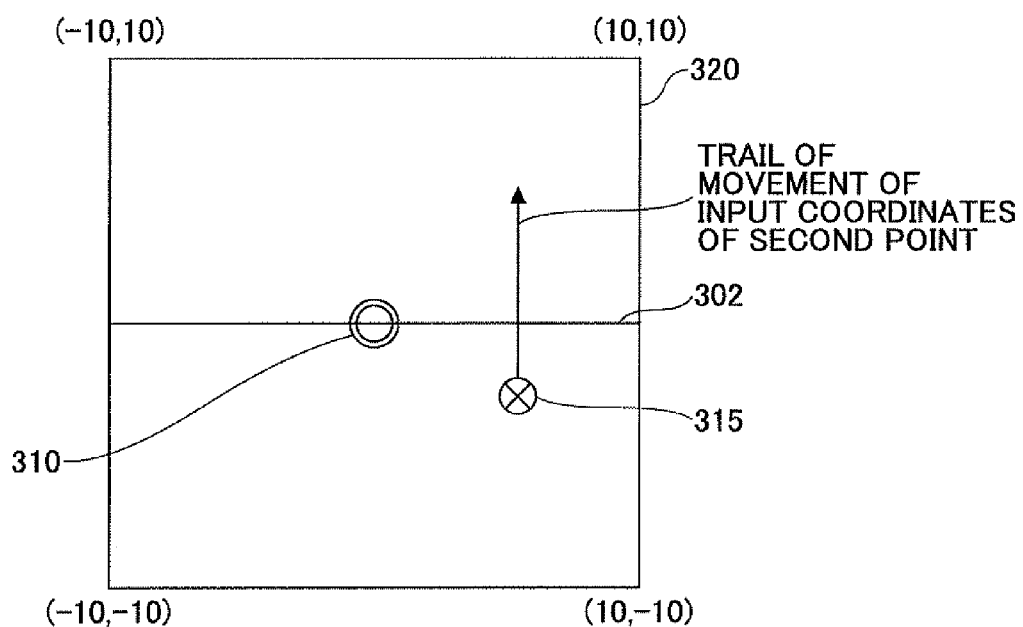
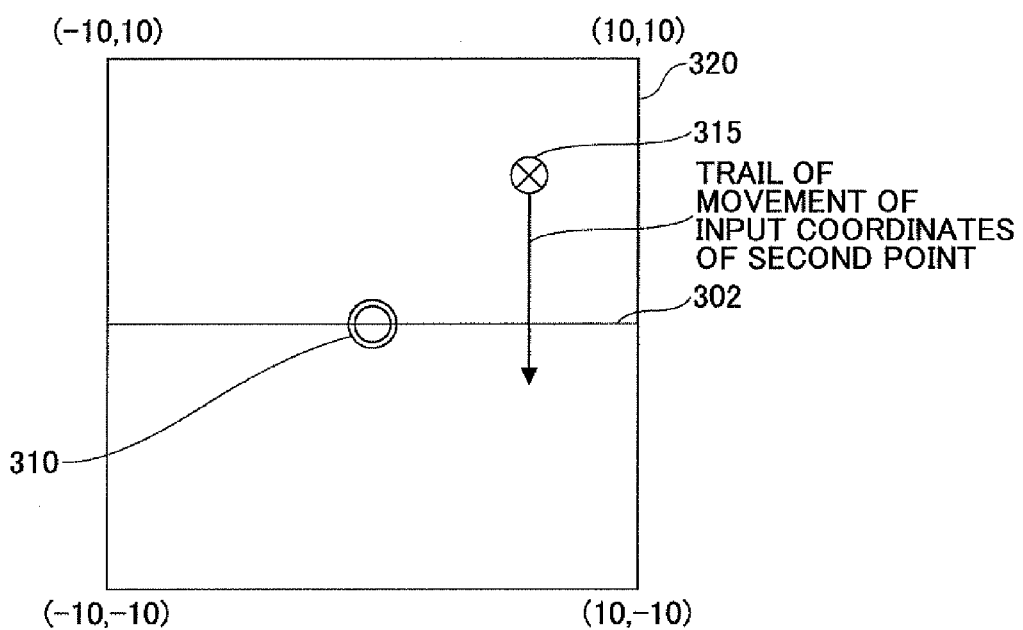

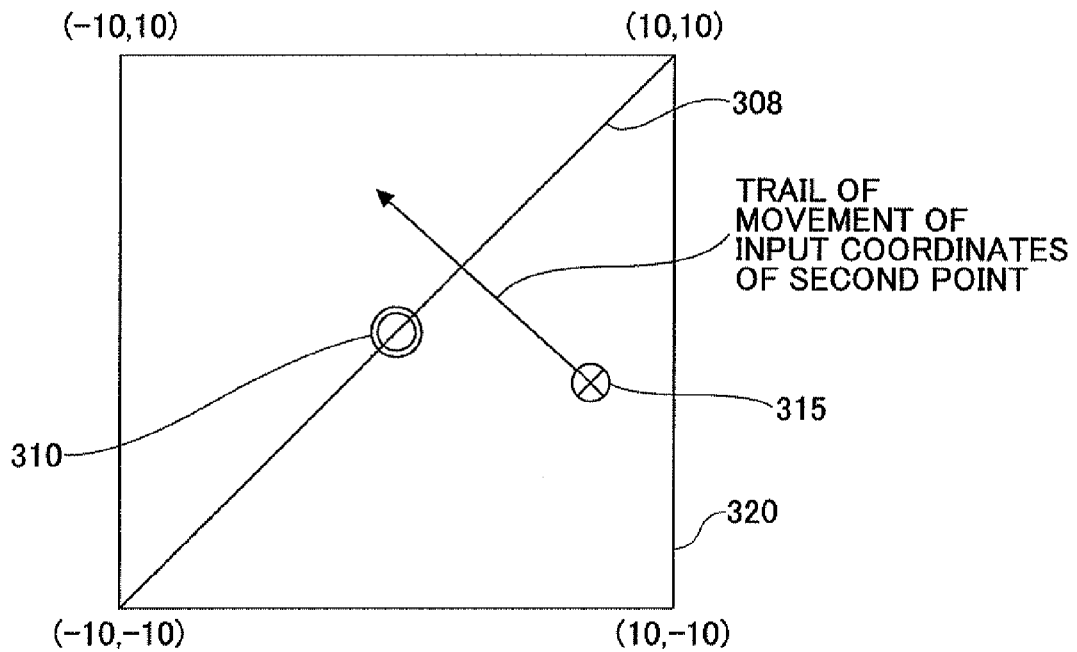
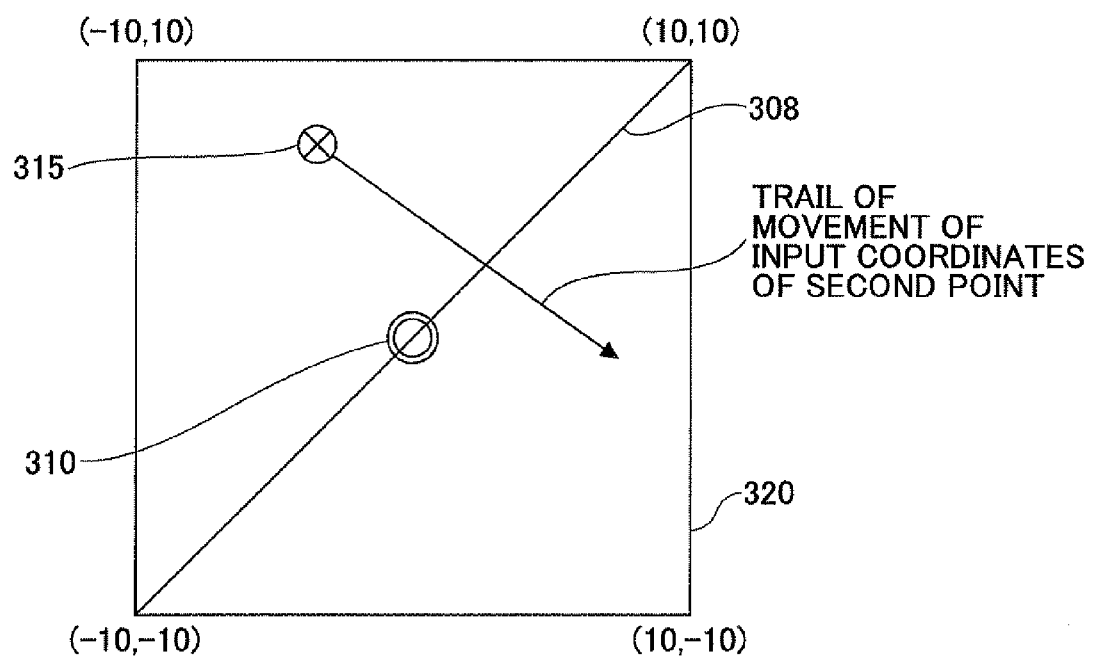

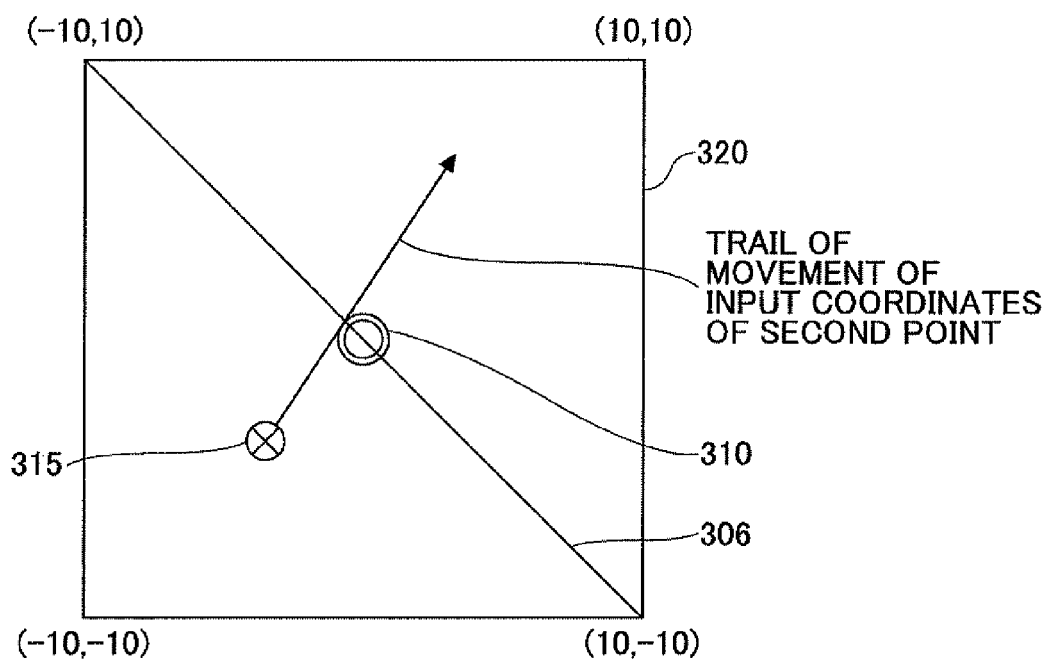
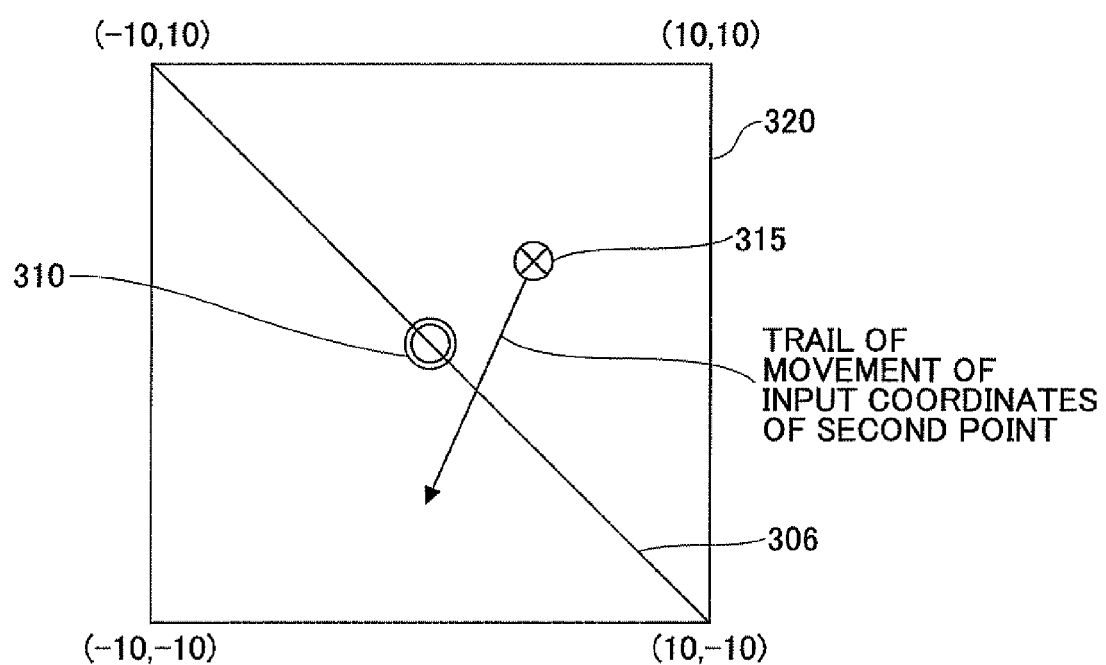

TOUCHSCREEN PANEL UNIT, SCROLLING CONTROL METHOD, AND RECORDING MEDIUM

CROSS-REFERENCE TO RELATED APPLICATION

The present application is based upon and claims the benefit of priority of Japanese Patent Application No. 2009-178381, filed on Jul. 30, 2009, the entire contents of which are incorporated herein by reference.

BACKGROUND OF THE INVENTION

1. Field of the Invention

The present invention relates to a multi-touch compliant touchscreen panel unit.

2. Description of the Related Art

A touchscreen panel unit is an input device whose display surface is touched directly for operating an apparatus. Unlike a keyboard or a mouse, the touchscreen panel unit makes it possible to make inputs by directly touching buttons or a software keyboard displayed on the display screen, thus having the advantage of enabling intuitive operations and making operations easy to understand even for users unfamiliar with the apparatus. A liquid crystal display (LCD) may be used for the touchscreen panel unit.

Further, there is a touchscreen panel unit that can be operated by being touched at multiple points simultaneously. Such a touchscreen panel unit is called a multi-touch touchscreen panel unit. In the multi-touch touchscreen panel unit, it is possible to make an input by simultaneously touching multiple points on the display screen. This enables multiple users to work together by touching a large screen. Further, it is possible to move and rotate an object and to zoom in or out an image by touching the screen simultaneously with multiple fingers.

For related techniques, reference may be made to, for example, Japanese Laid-Open Patent Application No. 2007-80291, Japanese Laid-Open Patent Application No. 2007-4762, and Japanese Laid-Open Patent Application No. 2001-306247.

The touchscreen panel unit displays externally input information on a display screen. Further, in response to a user touching a predetermined region displayed on the display screen, the touchscreen panel unit detects the touched predetermined region, and outputs information corresponding to the predetermined region. Further, in response to application of pressure to a predetermined region on the display screen with a pen dedicated to touchscreen panels, such as a stylus, or an ordinary pen, the touchscreen panel unit detects the predetermined region and outputs information corresponding to the predetermined region. A user can perform an operation corresponding to a predetermined region displayed on the display by touching the predetermined region.

If information to be displayed does not fit in the display screen, the touchscreen panel unit can specify a displayable partial region of the information to be displayed. By moving the specified displayable partial region, it is possible to display the information to be displayed. For example, the displayable partial region is specified with a scroll bar. The scroll bar is a graphical user interface (GUI) for moving a display region. Generally, the scroll bar includes a horizontal scroll bar for moving the displayable partial region horizontally relative to the display screen and a vertical scroll bar for moving the displayable partial region vertically relative to the display screen. For example, the horizontal scroll bar is provided at the bottom of the displayable partial region and the vertical scroll bar is provided on the right side of the displayable partial region.

SUMMARY OF THE INVENTION

According to one aspect of the present invention, a touchscreen panel unit includes a scrolling determination part configured to determine whether to scroll a displayable region of information to be displayed on a screen based on a positional relationship between a position of a first contact with the screen and a position of a second contact with the screen; a scrolling setting part configured to set a scrolling direction and a scrolling distance of the displayable region based on the position of the first contact and a contact position path starting at the position of the second contact, in response to the scrolling determination part determining that the displayable region is to be scrolled; and a scrolling information output part configured to output information indicating the scrolling direction and the scrolling distance set by the scrolling setting part.

According to one aspect of the present invention, a scrolling control method includes determining whether to scroll a displayable region of information to be displayed on a screen based on a positional relationship between a position of a first contact with the screen and a position of a second contact with the screen; setting a scrolling direction and a scrolling distance of the displayable region based on the position of the first contact and a contact position path starting at the position of the second contact, in response to determining that the displayable region is to be scrolled; and outputting information indicating the scrolling direction and the scrolling distance set by the setting.

According to one aspect of the present invention, a computer-readable recording medium is provided in which a program is recorded for causing a processor of a computer to execute the scrolling control method as set forth above.

The object and advantages of the embodiment will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating scrolling determination in the system of FIG. 1 according to the embodiment of the present invention;

FIG. 7 is another diagram illustrating the scrolling determination in the system of FIG. 1 according to the embodiment of the present invention;

FIG. 10 is another diagram illustrating the scrolling determination in the system of FIG. 1 according to the embodiment of the present invention;

FIG. 11 is another diagram illustrating the scrolling determination in the system of FIG. 1 according to the embodiment of the present invention;

FIG. 12 is another diagram illustrating the scrolling determination in the system of FIG. 1 according to the embodiment of the present invention;

FIG. 13 is another diagram illustrating the scrolling determination in the system of FIG. 1 according to the embodiment of the present invention.

DETAILED DESCRIPTION OF THE PREFERRED EMBODIMENTS

Figure 1:
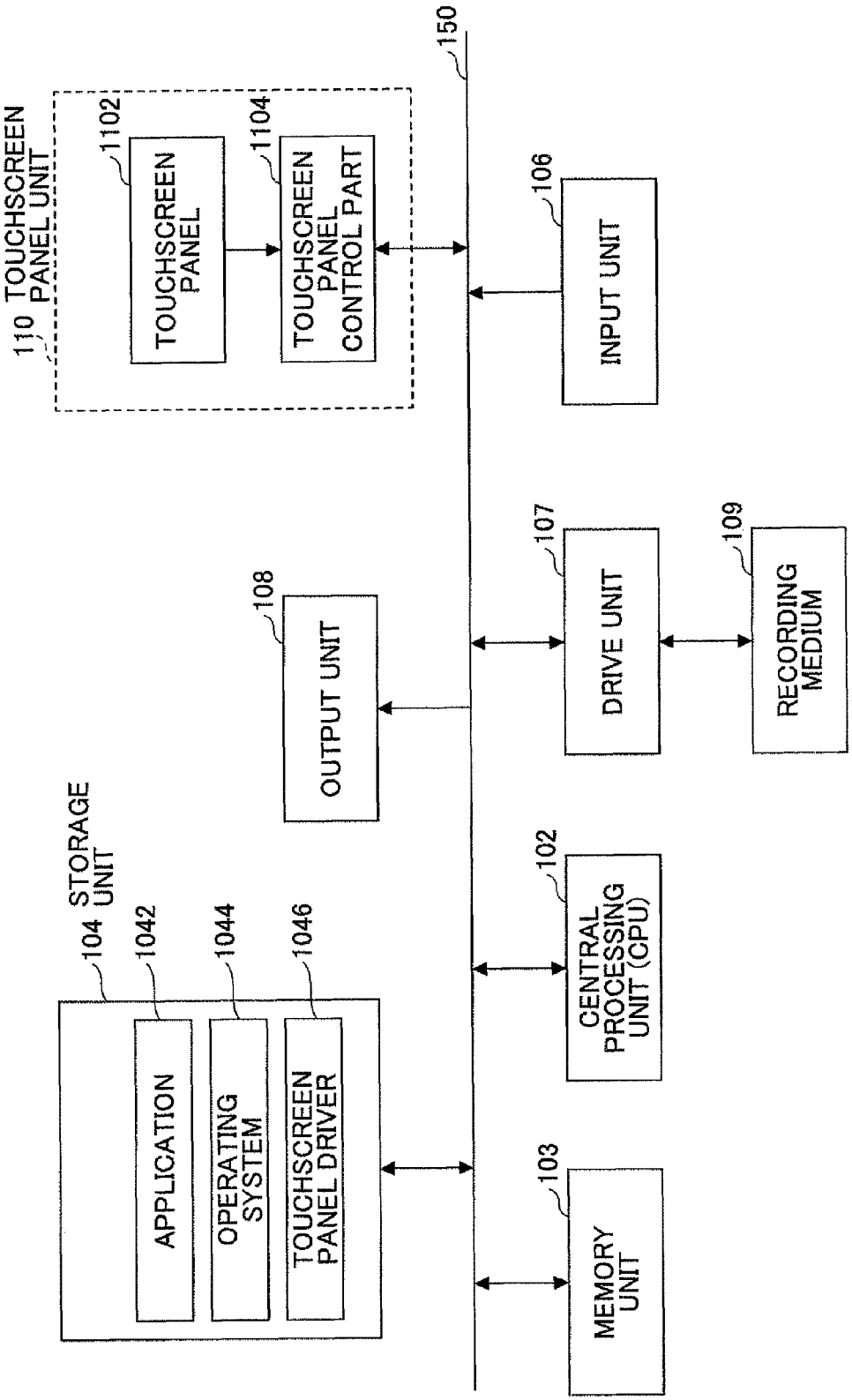
FIG. 1 is a block diagram illustrating a system to which a touchscreen panel unit is applied according to an embodiment of the present invention.

In the case of providing a horizontal scroll bar and a vertical scroll bar on the display screen as described above, no inputs can be made in regions where the horizontal scroll bar and the vertical scroll bar are provided. In other words, the regions where the horizontal scroll bar and the vertical scroll bar are provided are used only for moving the displayable partial region. This causes the problem of further reduction in the displayable partial region in the case where information to be displayed does not fit in the display screen.

For example, a computer operated through a touchscreen panel unit generally includes a central processing unit (CPU), a storage unit, an input unit, and an output unit. In such a computer, it is possible to directly specify a position or a region on the display screen with the touchscreen panel unit, but it is impossible to specify regions where a horizontal scroll bar and a vertical scroll bar are provided.

According to one aspect of the present invention, a touchscreen panel unit and a scrolling control method are provided that enable scroll operations based on the positional relationship between the input coordinates of multiple points without providing scroll bars.

According to one aspect of the present invention, there is provided a computer-readable recording medium storing a program for causing a processor of a computer to execute such a scrolling control method.

A description is given below, with reference to the accompanying drawings, of an embodiment of the present invention.

In the drawings, elements having the same function are referred to by the same reference numeral, and are not described repetitively after the initial description.

FIG. 1 is a block diagram illustrating a system to which a touchscreen panel unit according to an embodiment of the present invention is applied. FIG. 1 mainly illustrates a hardware configuration of the system.

Referring to FIG. 1, a system 100 includes a central processing unit (CPU) 102, a memory unit 103, a storage unit 104, an input unit 106, a drive unit 107, an output unit 108, and a touchscreen panel unit 110, which units are interconnected via a bus 150. In this embodiment, a description is given of a computer system by way of example. The touchscreen panel unit 110 of this embodiment may be applied not only to computer systems but also to apparatuses and systems including a touchscreen panel unit having a multi-touch function, such as personal digital assistants (PDAs) and portable terminals.

The CPU 102 controls the storage unit 104, the input unit 106, the output unit 108, and the touchscreen panel unit 110. The CPU 102 operates in accordance with a program stored in the storage unit 104 to perform predetermined processing.

The memory unit 103 is, for example, a random-access memory (RAM) read and written by, for example, the CPU 102.

The storage unit 104 includes an application 1042, an operating system (OS) 1044, and a touchscreen panel driver 1046. Examples of the storage unit 104, which is an external or secondary storage that stores data and programs inside a computer, include hard disks, fixed disks, flexible disks, magneto-optical (MO) disks, compact disks-recordable (CD-Rs), and magnetic tapes.

The application 1042 is software having the function of implementing the work done by a user on the system 100. Examples of the application 1042 include word processing software, spreadsheet software, a database management system (DBMS), and a media player.

The operating system 1044 is software that provides application software with an interface, which is abstracted hardware, in this system 100. The operating system 1044 supports the multi-touch function.

The touchscreen panel driver 1046 is software (a device driver) for providing the CPU 102 operating as the operating system 1044 with an interface with the touchscreen panel unit 110.

The input unit 106, which includes, for example, a keyboard and a mouse, is a device for inputting instructions and data to the system 100. The instructions include those for the operating system 1044 and the application 1042.

The output unit 108 includes, for example, a display, and displays the state and the results of processing executed by the system 100. These processing state and results include those of processing executed by the operating system 1044 and the application 1042. Examples of the display include a liquid crystal display (LCD), a cathode ray tube (CRT), a plasma display panel, and an organic electro-luminescence (EL) display.

The touchscreen panel unit 110 includes a touchscreen panel 1102 and a touchscreen panel control part 1104. The touchscreen panel 1102 may be integrated with, for example, the output unit 108 for use. By touching (contacting) what is displayed on the touchscreen panel 1102 integrated with the output unit 108, it is possible to perform an operation corresponding to what is displayed. What is displayed on the touchscreen panel 1102 may be touched with a finger or a pen (or a stylus). Examples of systems of touchscreen panels include a resistive film system, a capacitive system, an infrared system, an ultrasonic system, and an electromagnetic induction system, any of which may be used in this embodiment.

The touchscreen panel control part 1104 inputs an output signal corresponding to what is displayed on the touchscreen panel 1102 to the CPU 102 operating as the touchscreen panel driver 1046 in response to a user touching what is displayed on the touchscreen panel 1102. The output signal includes information on a specified position (direct coordinates) on the touchscreen panel 1102.

Figure 2:
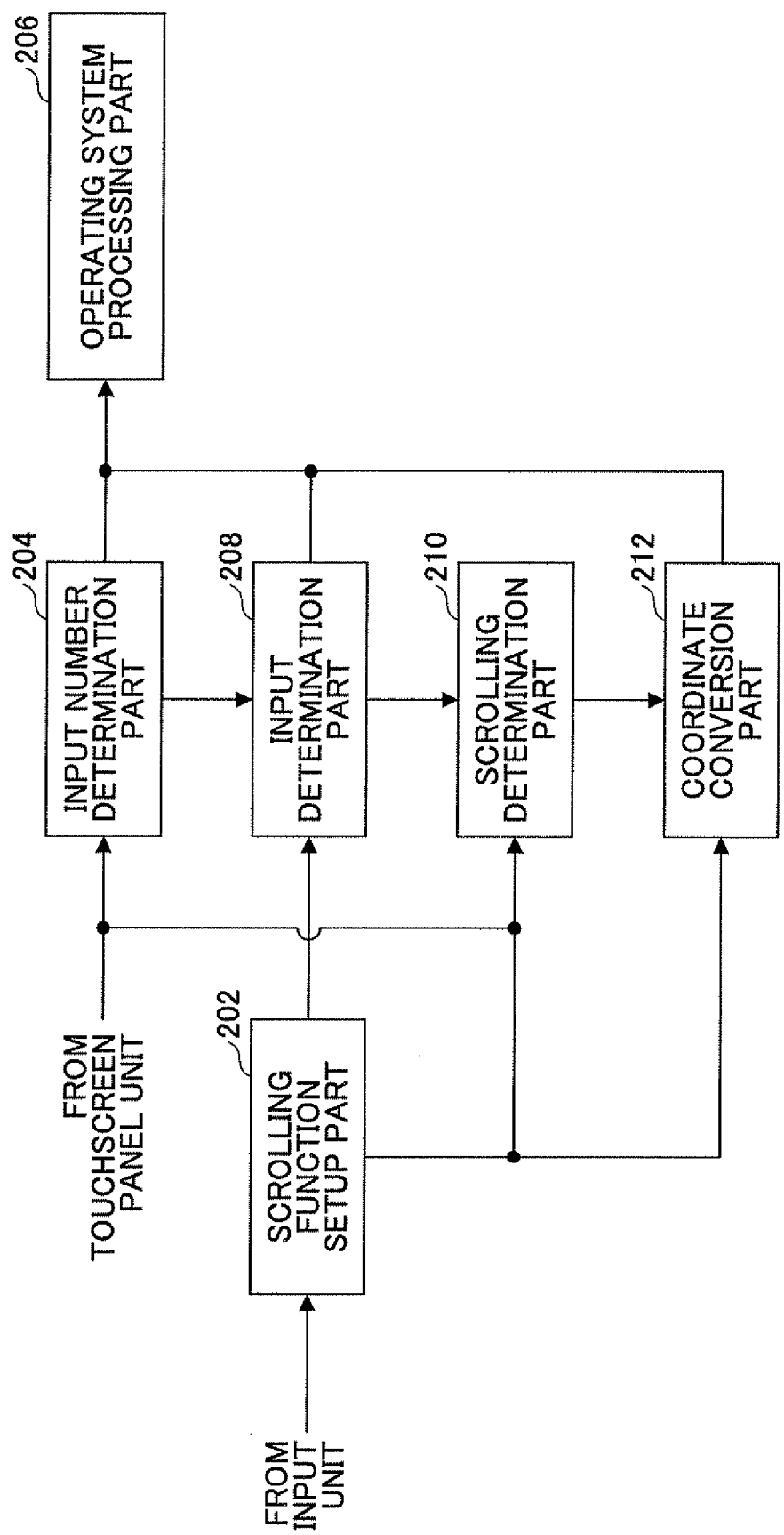
FIG. 2 is a functional block diagram illustrating the system of FIG. 1 according to the embodiment of the present invention.

FIG. 2 is a functional block diagram illustrating functions of the system 100. FIG. 2 mainly illustrates functions executed by the CPU 102 (FIG. 1).

According to the system 100, when a user touches (contacts) the touchscreen panel 1102 (FIG. 1), the coordinates of the position of the touch (contact) (first coordinates) are detected and retained. When the user retouches the display screen (the touchscreen panel 1102) while the first coordinates are retained (that is, while the first touch is maintained), the first coordinates are set (determined), and the positional relationship between the coordinates of the position of the last touch (contact) (second coordinates) and the first coordinates is determined. The user may touch two points on the display screen simultaneously. It is determined whether to perform scrolling based on the positional relationship between the first coordinates and the second coordinates. If it is determined that scrolling is to be performed, scrolling is executed in accordance with the first coordinates and the path or trail of a contact position (the position of a touch or contact on the display screen) starting at the second coordinates.

Referring to FIG. 2, the system 100 includes a scrolling function setup part 202, an input number determination part 204, an operating system processing part 206, an input determination part 208, a scrolling determination part 210, and a coordinate conversion part 212.

The scrolling function setup part 202 sets up a scrolling-related function. This setup may be provided in advance at the time of starting using this system 100. Further, it may be made possible to change the setup during use of the system 100. A user may do this setup with the input unit 106 (FIG. 1).

Figure 3:
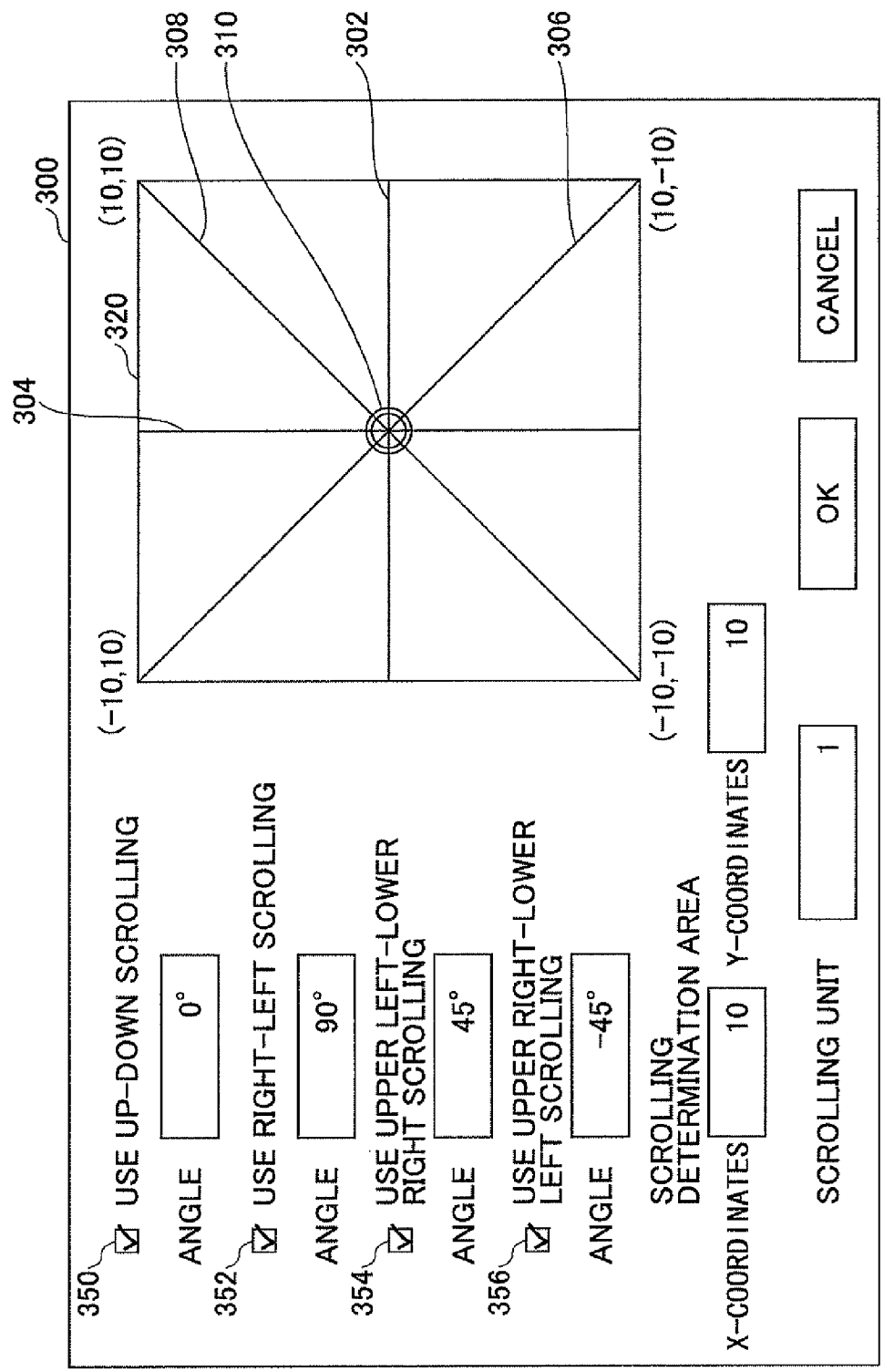
FIG. 3 is a diagram illustrating a scrolling function setup screen for setting up a scrolling function of the touchscreen panel unit according to the embodiment of the present invention.

FIG. 3 is a diagram illustrating a scrolling function setup screen 300, which is, for example, displayed on the output unit 108 (FIG. 1). FIG. 3 illustrates a screen for setting up a scrolling function. For example, FIG. 3 illustrates a setup for using up-down (upward and downward) scrolling and a setup for using right-left (rightward and leftward) scrolling. The up-down scrolling may be referred to as vertical scrolling, and the right-left scrolling may be referred to as horizontal scrolling.

FIG. 3 further illustrates a setup for using upper left-lower right scrolling (scrolling in an upper-left direction and in a lower-right direction) and a setup for using upper right-lower left scrolling (scrolling in an upper-right direction and in a lower-left direction). By providing a setup for using upper left-lower right scrolling and/or a setup for using upper right-lower left scrolling, it is possible to perform diagonal scrolling (scrolling in an oblique direction) without combining the up-down scrolling and the right-left scrolling.

Further, in the case of setting scrolling directions, corresponding check boxes are displayed. By way of example, FIG. 3 illustrates check boxes 350, 352, 354, and 356 for using the up-down scrolling, the right-left scrolling, the upper left-lower right scrolling, and the upper right-lower left scrolling, respectively. A user checks one of the check boxes 350, 352, 354, and 356 corresponding to scrolling that the user wishes to use. The system 100 executes scrolling corresponding to the checked one of the check boxes 350, 352, 354, and 356.

Further, the scrolling function setup screen 300 of the system 100 includes a display for setting or determining the angle of a boundary line used in determining a scrolling direction in which scrolling is performed. For example, a position 310 of the first coordinates is displayed on the right side in the scrolling function setup screen 300 illustrated in FIG. 3. Boundary lines 302, 304, 306, and 308 for determining the up-down scrolling, the right-left scrolling, the upper right-lower left scrolling, and the upper left-lower right scrolling, respectively, with respect to the position 310 are displayed. Scrolling is performed when the path of a contact position starting at the second coordinates crosses the boundary line. According to the system 100, it is possible to set the angles of the boundary lines 302, 304, 306, and 308. This makes it possible to change conditions for determining a scrolling direction as desired by a user.

The scrolling function setup screen 300 of the system 100 further includes a display for setting or determining conditions for determining whether to perform scrolling. For example, a scrolling determination area (range) 320, that is, the range of the second coordinates relative to the first coordinates in the case of determining that scrolling is to be performed, is set. The scrolling determination area 320 indicates the range of positions of the second coordinates relative to the first coordinates for determining that scrolling is to be performed. For example, if the scrolling determination area 320 is large, the scrolling executed in accordance with the path of a contact position starting at the second coordinates can be increased in amount. On the other hand, if the scrolling determination range is small, the scrolling executed in accordance with the path of a contact position starting at the second coordinates can be reduced in amount.

Further, if multiple windows are displayed, it is preferable that the scrolling determination area 320 be set within a window that is a target of scrolling. This is because if the scrolling determination area 320 is larger than the target window, another window may be called. Further, the scrolling determination area 320 may be set with respect to each of x-coordinates (x-axis) and y-coordinates (y-axis). This makes it possible to set the scrolling determination area 320 in accordance with (the size or shape of) a screen. Further, the scrolling determination area 320 may be set based on a particular portion of information to be displayed, for example, a displayable partial region specified with respect to information to be displayed, if the information to be displayed does not fit in the screen. Further, the scrolling determination area 320 may be circular in shape with its center at the first coordinates. In the case of setting a circular scrolling determination area, its radius is set.

The scrolling function setup screen 300 of the system 100 further includes a display for setting or determining a scrolling unit. The scrolling unit is used to determine a distance to be traveled in the case of performing scrolling. The scrolling unit may be expressed with dots. Reducing the value of the scrolling unit makes it possible to display scrolling more smoothly. On the other hand, increasing the value of the scrolling unit makes it possible to increase scrolling speed.

The input number determination part 204 determines whether a touch on the touchscreen panel 1102 by a user corresponds to an initial (first) input. If the input number determination part 204 determines that a touch on the touchscreen panel 1102 by a user corresponds to an initial input, the input number determination part 204 retains the input information (first coordinate information) and also inputs the input information to the operating system processing part 206. If the input number determination part 204 determines that a touch on the touchscreen panel 1102 by a user does not correspond to an initial input, the input number determination part 204 inputs the input information that does not correspond to an initial input (second coordinate information) and the retained first coordinate information to the input determination part 208.

The input determination part 208 is connected to the scrolling function setup part 202, the input number determination part 204, the operating system processing part 206, and the scrolling determination part 210. The input determination part 208 determines, based on the information input by the input number determination part 204, whether a user is requesting scrolling.

Figure 4:
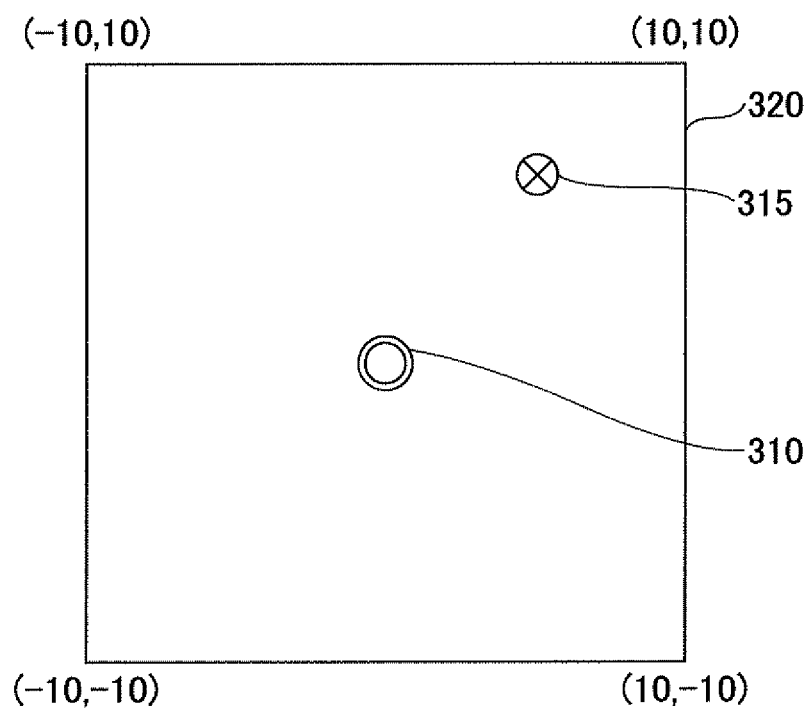
FIG. 4 is a diagram illustrating determination of the scrolling area of the touchscreen panel unit according to the embodiment of the present invention.

FIG. 4 is a diagram illustrating an example of the scrolling determination area 320 described above with reference to FIG. 3.

FIG. 4 illustrates the position 310 of the first coordinates, a position 315 of the second coordinates, and the scrolling determination area 320. For example, the input determination part 208 determines whether the second coordinates are included in the scrolling determination area 320 around (centered on) the first coordinates based on the information input by the input number determination part 204 and the scrolling determination area 320 set by the scrolling function setup part 202.

In the case illustrated in FIG. 4, a value of 10 is set (entered) for x-coordinates and a value of 10 is set (entered) for y-coordinates on the scrolling function setup screen 300 illustrated in FIG. 3 as the scrolling determination area 320. In the case of setting 10 as a value for x-coordinates and setting 10 as a value for y-coordinates, the scrolling determination area 320 is set within an x-coordinate range of ±10 and a y-coordinate range of ±10 with reference to (centered on) the position 310 of the first coordinates. The input determination part 208 determines that scrolling is requested if the position 315 of the second coordinates is included in the scrolling determination area 320. If the input determination part 208 determines that scrolling is requested, the input determination part 208 inputs the first coordinates and the second coordinates to the scrolling determination part 210. If the input determination part 208 determines that scrolling is not requested, the input determination part 208 inputs the first coordinates and the second coordinates to the operating system processing part 206.

The scrolling determination part 210 is connected to the scrolling function setup part 202, the input determination part 208, and the coordinate conversion part 212. Further, coordinate information is input to the scrolling determination part 210 from the touchscreen panel unit 110 (FIG. 1).

If the input determination part 208 determines that scrolling is requested, the input determination part 208 inputs the first coordinates and the second coordinates to the scrolling determination part 210. Then, the scrolling determination part 210 determines the positional relationship between the first coordinates and the second coordinates and the path of a contact position starting at the second coordinates based on the first coordinates and the second coordinates.

If the path of a contact position starting at the second coordinates goes beyond, that is, crosses, a boundary line, the scrolling determination part 210 determines that scrolling is to be performed in a direction corresponding to the boundary. The direction corresponding to the boundary indicates the scrolling direction determined based on the boundary. If the path of a contact position starting at the second coordinates does not go beyond, that is, does not cross, a boundary line, the scrolling determination part 210 determines that scrolling is not to be performed.

If the scrolling determination part 210 determines that scrolling is to be performed, the scrolling determination part 210 inputs the second coordinate information and the coordinate information of the path of a contact position starting at the second coordinates to the coordinate conversion part 212. The coordinate information of the path of a contact position starting at the second coordinates may include endpoint coordinates and the coordinate information included in the path.

The coordinate conversion part 212 is connected to the scrolling function setup part 202, the operating system processing part 206, and the scrolling determination part 210. The coordinate conversion part 212 converts the input second coordinate information and coordinate information of the path of a contact position starting at the second coordinates into scrolling data. For example, if the scrolling determination part 210 determines that up-down scrolling is to be performed, the coordinate conversion part 212 may determine a vertical difference between coordinates and determine the difference as scrolling data. For example, the coordinate conversion part 212 may calculate a difference between y-coordinates. On the other hand, if the scrolling determination part 210 determines that right-left scrolling is to be performed, the coordinate conversion part 212 may determine a horizontal difference between coordinates and determine the difference as scrolling data. For example, the coordinate conversion part 212 may calculate a difference between x-coordinates. Further, the coordinate conversion part 212 may determine the distance between the second coordinate information (second coordinates) and the endpoint coordinates and determine the distance as scrolling data.

The coordinate conversion part 212 converts the scrolling data into the amount of traveling (movement) for which scrolling is to be performed. For example, the coordinate conversion part 212 determines the amount of traveling for which scrolling is to be performed, or the amount of scrolling, based on the scrolling data and the scrolling unit set by the scrolling function setup part 202. For example, the coordinate conversion part 212 may determine the amount of traveling by multiplying the above-described distance by the scrolling unit. The coordinate conversion part 212 inputs the scrolling direction and the amount of traveling to the operating system processing part 206.

The operating system processing part 206 is connected to the input number determination part 204, the input determination part 208, and the coordinate conversion part 212. The operating system processing part 206 processes the first coordinates input by the input number determination part 204 as coordinates input by the touchscreen panel 1102. Further, the operating system processing part 206 processes the first coordinates and the second coordinates input by the input determination part 208 as coordinates input by the touchscreen panel 1102. For example, an operating system that supports a multi-touch function performs processing based on the first coordinates and the second coordinates. Further, the operating system processing part 206 performs scrolling based on the scrolling direction and the amount of traveling input by the coordinate conversion part 212.

Figure 5:
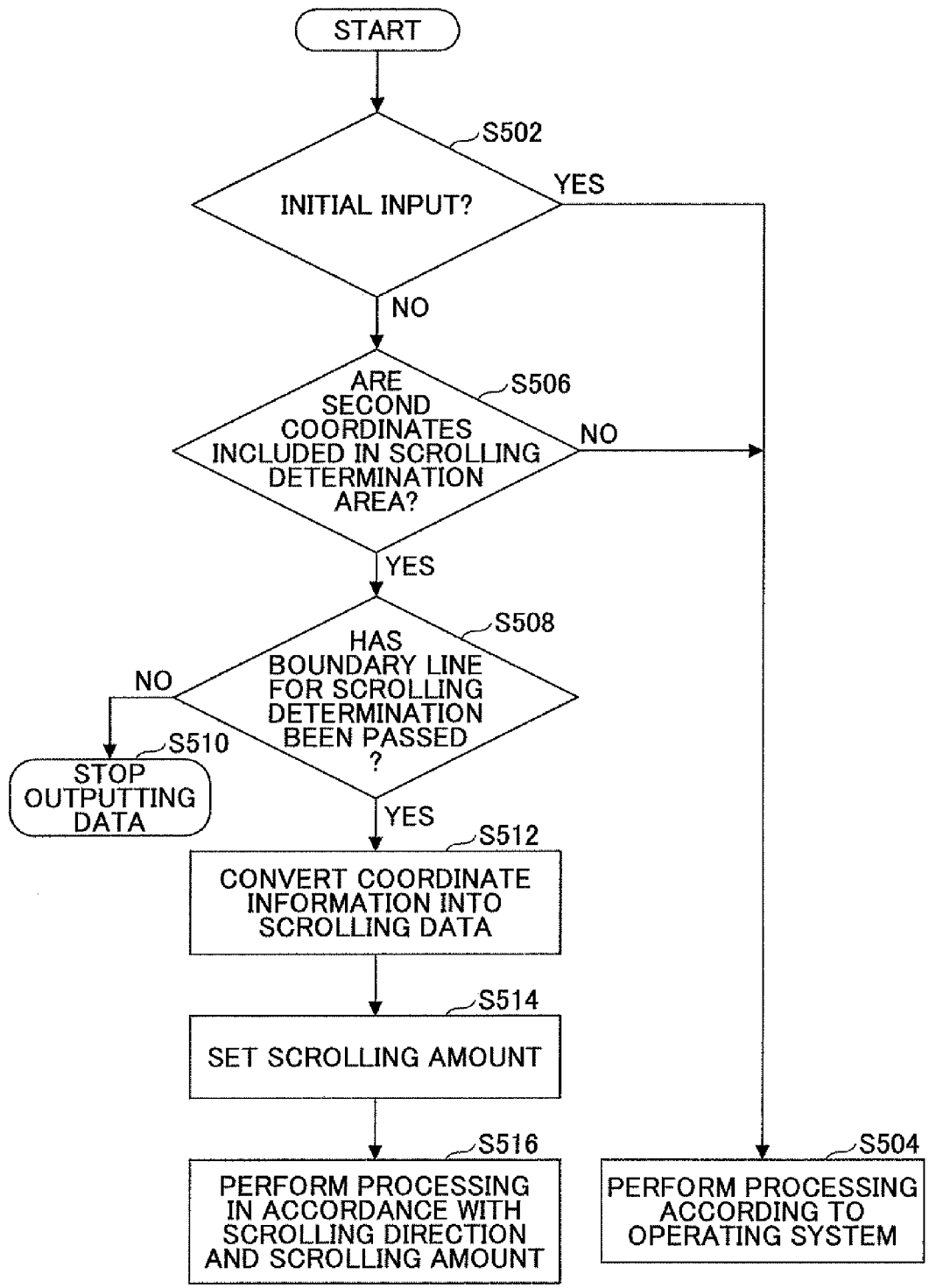
FIG. 5 is a flowchart illustrating processing performed by the system of FIG. 1 according to the embodiment of the present invention.

FIG. 5 is a flowchart illustrating an operation of the system 100.

Before the start of processing according to this flowchart, the scrolling function is set up with the scrolling function setup screen 300 illustrated in FIG. 3. As described above, the setup of the scrolling function may be changed during use of this system 100.

Referring to FIG. 5, in step S502, the system 100 determines whether a touch on the screen (the touchscreen panel 1102) by a user corresponds to an initial input. For example, the input number determination part 204 determines whether a touch on the screen by a user corresponds to an initial input based on whether coordinate information is retained in the input number determination part 204.

If no coordinate information is retained in the input number determination part 204 (YES in step S502), the input number determination part 204 determines that the user's touch corresponds to an initial input. On the other hand, if coordinate information is retained in the input number determination part 204 (NO in step S502), the input number determination part 204 determines that the user's touch does not correspond to an initial input. For example, if the input number determination part 204 detects a touch on the screen by a user while continuing to detect the user's initial touch, the input number determination part 204 determines the second touch as not corresponding to an initial input, that is, determines the second touch as a second input, and fixes the retained coordinate information of the first touch (initial input).

That is, according to the system 100, if it is determined that a user's touch corresponds to an initial input (YES in step S502), the input information (first coordinate information), is retained, and the input information is transmitted to the CPU 102 operating as an operating system. Then, in step S504, the CPU 102, functioning as an operating system, performs processing based on the transmitted input information. For example, if the input number determination part 204 determines that a user's touch corresponds to an initial input, the input number determination part 204 retains the input information (first coordinate information), and transmits the input information to the operating system processing part 206. The operating system processing part 206 performs processing based on the transmitted input information.

According to the system 100, if it is determined that a user's touch does not correspond to an initial input (NO in step S502), the input information is determined as second coordinate information. Then, in step S506, it is determined whether the second coordinates are included in the scroll determination area based on the first coordinate information and the second coordinate information. For example, the input determination part 208 determines whether the second coordinates are included in the scrolling determination area 320 (FIG. 3) centered on the first coordinates based on the first coordinates and the second coordinates input by the input number determination part 204 and the scrolling determination area 320 set by the scrolling function setup part 202. Here, the first coordinates are the coordinates of the position of the user's first touch determined as corresponding to an initial input, and the second coordinates are the coordinates of the position of the user's second touch (subsequent to the user's first touch) determined as not corresponding to an initial touch.

If the second coordinates are not included in the scrolling determination area 320 (NO in step S506), in step S504, the CPU 102 operating as an operating system is notified of the first coordinates and the second coordinates, and performs processing based on the first coordinates and the second coordinates. For example, if the input determination part 208 determines that the second coordinates are not included in the scrolling determination area 320, the input determination part 208 notifies the operating system processing part 206 of the first coordinates and the second coordinates. Then, the operating system processing part 206 performs processing based on the first coordinates and the second coordinates of which the operating system processing part 206 has been notified by the input determination part 208.

On the other hand, if the second coordinates are included in the scrolling determination area 320 (YES in step S506), the system 100 determines the positional relationship between the first coordinates and the second coordinates and the path of a contact position starting at the second coordinates.

Then, in step S508, the system 100 determines whether the path of a contact position starting at the second coordinates has passed, that is, has crossed, a boundary line. For example, the scrolling determination part 210 determines the positional relationship between the first coordinates and the second coordinates and the path of a contact position starting at the second coordinates. The scrolling determination part 210 determines whether the path of a contact position starting at the second coordinates has passed a boundary line.

If it is not determined that the path of a contact position starting at the second coordinates has passed a boundary line (NO in step S508), in step S510, the system 100 stops outputting data. For example, if the scrolling determination part 210 does not determine that the path of a contact position starting at the second coordinates has passed a boundary line, the scrolling determination part 210 determines that an operation corresponding to scrolling has not been performed, and waits until the scrolling determination part 210 determines that the path has passed a boundary line.

On the other hand, if it is determined that the path of a contact position starting at the second coordinates has passed a boundary line (YES in step S508), in step S512, the system 100 determines a scrolling direction based on the boundary line and the path of a contact position starting at the second coordinates, and converts the coordinate information included in the path into scrolling data. For example, the coordinate conversion part 212 converts the coordinate information included in the path of a contact position starting at the second coordinates into scrolling data. For example, the coordinate conversion part 212 determines the distance between the second coordinates and the endpoint coordinates.

Then, in step S514, the system 100 sets (determines) the amount of scrolling. For example, the coordinate conversion part 212 converts the distance into the amount of traveling for which scrolling is to be performed based on the distance between the second coordinates and the endpoint coordinates. The coordinate conversion part 212 outputs the scrolling direction and the amount of scrolling and inputs them to the operating system processing part 206.

Then, in step S516, the system 100 performs scrolling in accordance with the scrolling direction and the amount of scrolling. For example, the operating system processing part 206 performs scrolling based on the scrolling direction and the amount of scrolling input by the coordinate conversion part 212.

The operation of step S502 and the operation of steps S506 through S514 are executed by the CPU 102 performing processing in accordance with the touchscreen panel driver 1046 (FIG. 1). The touchscreen panel driver 1046, which is a program for causing the CPU 102 to operate as a touchscreen panel unit, is provided in a recorded state in a recording medium 109 (FIG. 1) such as a flexible disk, a CD-ROM, or a memory card. The program may be downloaded from, for example, an external server via a communications network such as a local area network (LAN) or the Internet. When the recording medium 109 is loaded into the drive unit 107 (FIG. 1), the program recorded in the recording medium 109 is read, and the CPU 102 writes the read program into the memory unit 103 (FIG. 1) such as a RAM or the storage unit 104 (FIG. 1) such as a hard disk drive (HDD) to perform processing. The program causes a computer (the CPU 102) to execute step S502 and steps S506 through S514 of FIG. 5. The program may cause a computer to execute at least part of step S502 and steps S506 through S514.

Next, a further description is given of the scrolling determination of step S508 described above with reference to FIG. 5.

FIG. 6 is a diagram illustrating the scrolling determination.

In the case illustrated in FIG. 6, the check box 350 for using up-down scrolling is checked on the scrolling function setup screen 300 of FIG. 3. Further, the angle of the boundary 302 for determining the up-down scrolling is zero degrees (0°). Further, the scrolling determination area 320 is set with a value of 10 for each of x-coordinates and y-coordinates.

In the case illustrated in FIG. 6, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 302, the scrolling determination part 210 determines that scrolling is to be performed in a direction corresponding to the boundary line 302. In the case illustrated in FIG. 6, since the path of a contact position crosses the boundary line 302 in the direction from the bottom to the top of the screen, it is determined that scrolling is to be performed in the upward direction.

FIG. 7 is another diagram illustrating the scrolling determination.

In the case illustrated in FIG. 7, the check box 350 for using up-down scrolling is checked on the scrolling function setup screen 300 of FIG. 3. Further, the angle of the boundary 302 for determining the up-down scrolling is zero degrees (0°). Further, the scrolling determination area 320 is set with a value of 10 for each of x-coordinates and y-coordinates.

In the case illustrated in FIG. 7, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 302, the scrolling determination part 210 determines that scrolling is to be performed in a direction corresponding to the boundary line 302. In the case illustrated in FIG. 7, since the path of a contact position crosses the boundary line 302 in the direction from the top to the bottom of the screen, it is determined that scrolling is to be performed in the downward direction.

Figure 8:
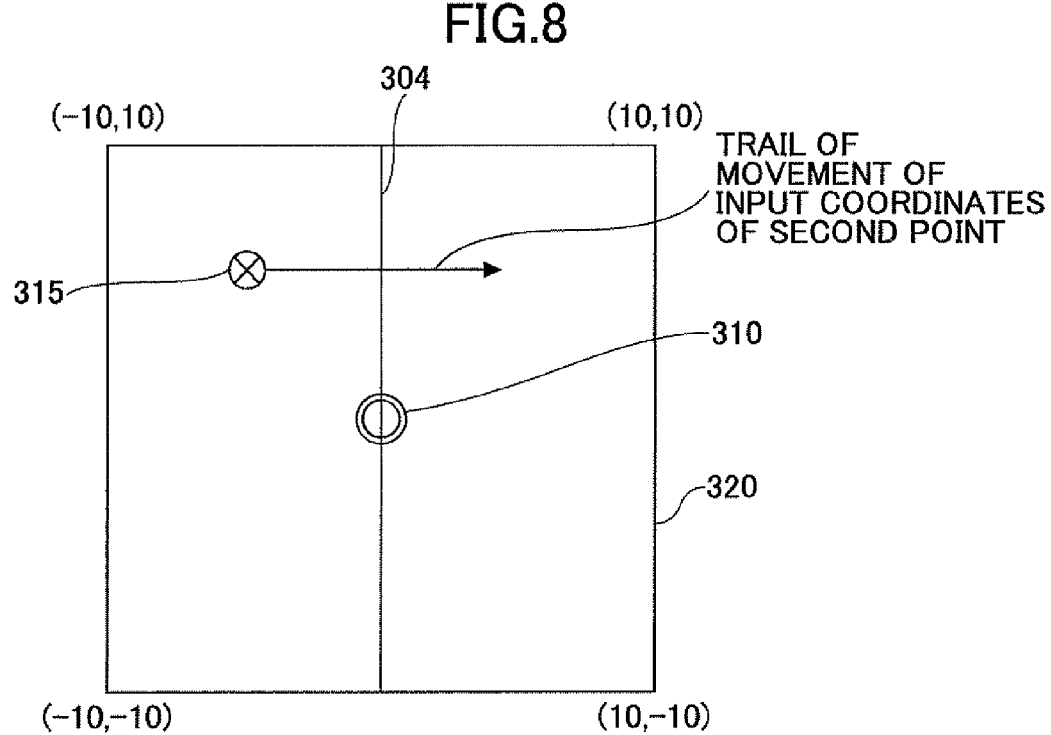
FIG. 8 is another diagram illustrating the scrolling determination in the system of FIG. 1 according to the embodiment of the present invention.

FIG. 8 is another diagram illustrating the scrolling determination.

In the case illustrated in FIG. 8, the check box 352 for using right-left scrolling is checked on the scrolling function setup screen 300 of FIG. 3. Further, the angle of the boundary 304 for determining the right-left scrolling is 90 degrees (90°). Further, the scrolling determination area 320 is set with a value of 10 for each of x-coordinates and y-coordinates.

In the case illustrated in FIG. 8, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 304, the scrolling determination part 210 determines that scrolling is to be performed in a direction corresponding to the boundary line 304. In the case illustrated in FIG. 8, since the path of a contact position crosses the boundary line 304 in the direction from the left to the right of the screen, it is determined that scrolling is to be performed in the rightward direction.

Figure 9:
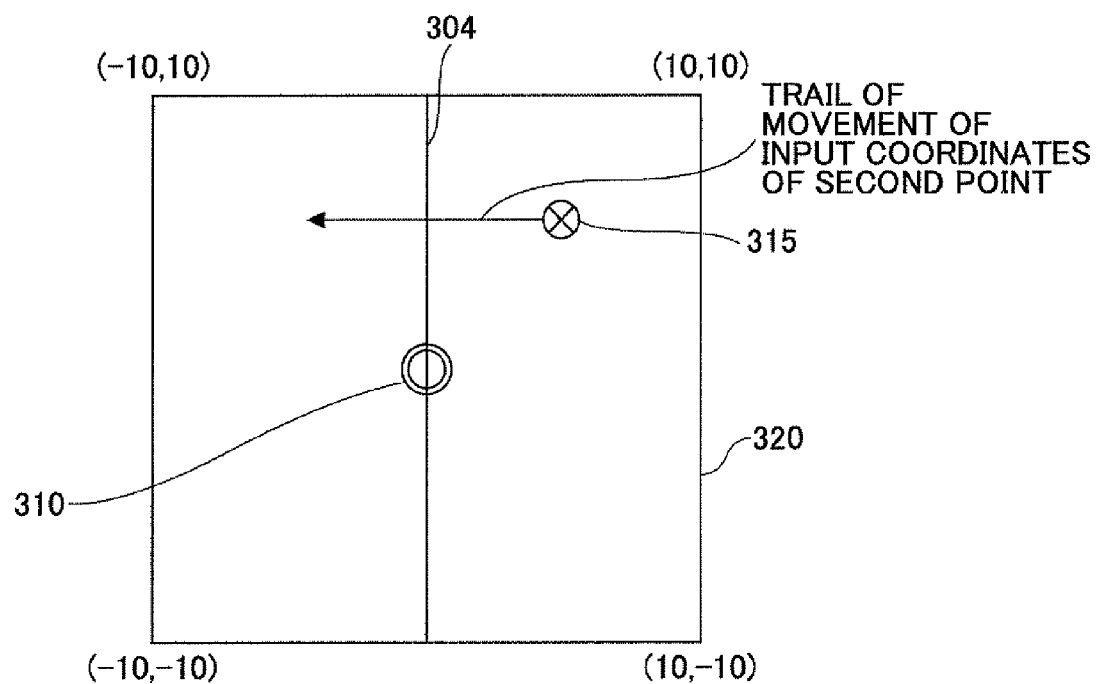
FIG. 9 is another diagram illustrating the scrolling determination in the system of FIG. 1 according to the embodiment of the present invention.

FIG. 9 is another diagram illustrating the scrolling determination.

In the case illustrated in FIG. 9, the check box 352 for using right-left scrolling is checked on the scrolling function setup screen 300 of FIG. 3. Further, the angle of the boundary 304 for determining the right-left scrolling is 90 degrees (90°). Further, the scrolling determination area 320 is set with a value of 10 for each of x-coordinates and y-coordinates.

In the case illustrated in FIG. 9, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 304, the scrolling determination part 210 determines that scrolling is to be performed in a direction corresponding to the boundary line 304. In the case illustrated in FIG. 9, since the path of a contact position crosses the boundary line 304 in the direction from the right to the left of the screen, it is determined that scrolling is to be performed in the leftward direction.

FIG. 10 is another diagram illustrating the scrolling determination.

In the case illustrated in FIG. 10, the check box 354 for using upper left-lower right scrolling is checked on the scrolling function setup screen 300 of FIG. 3. Further, the angle of the boundary 308 for determining the upper left-lower right scrolling is 45 degrees (45°). Further, the scrolling determination area 320 is set with a value of 10 for each of x-coordinates and y-coordinates.

In the case illustrated in FIG. 10, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 308, the scrolling determination part 210 determines that scrolling is to be performed in a direction corresponding to the boundary line 308. In the case illustrated in FIG. 10, since the path of a contact position crosses the boundary line 308 in the direction from the lower right to the upper left of the screen, it is determined that scrolling is to be performed in the upper left direction.

FIG. 11 is another diagram illustrating the scrolling determination.

In the case illustrated in FIG. 11, the check box 354 for using upper left-lower right scrolling is checked on the scrolling function setup screen 300 of FIG. 3. Further, the angle of the boundary 308 for determining the upper left-lower right scrolling is 45 degrees (45°). Further, the scrolling determination area 320 is set with a value of 10 for each of x-coordinates and y-coordinates.

In the case illustrated in FIG. 11, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 308, the scrolling determination part 210 determines that scrolling is to be performed in a direction corresponding to the boundary line 308. In the case illustrated in FIG. 11, since the path of a contact position crosses the boundary line 308 in the direction from the upper left to the lower right of the screen, it is determined that scrolling is to be performed in the lower right direction.

FIG. 12 is another diagram illustrating the scrolling determination.

In the case illustrated in FIG. 12, the check box 356 for using upper right-lower left scrolling is checked on the scrolling function setup screen 300 of FIG. 3. Further, the angle of the boundary 306 for determining the upper right-lower left scrolling is −45 degrees (−45°). Further, the scrolling determination area 320 is set with a value of 10 for each of x-coordinates and y-coordinates.

In the case illustrated in FIG. 12, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 306, the scrolling determination part 210 determines that scrolling is to be performed in a direction corresponding to the boundary line 306. In the case illustrated in FIG. 12, since the path of a contact position crosses the boundary line 306 in the direction from the lower left to the upper right of the screen, it is determined that scrolling is to be performed in the upper right direction.

FIG. 13 is another diagram illustrating the scrolling determination.

In the case illustrated in FIG. 13, the check box 356 for using upper right-lower left scrolling is checked on the scrolling function setup screen 300 of FIG. 3. Further, the angle of the boundary 306 for determining the upper right-lower left scrolling is −45 degrees (−45°). Further, the scrolling determination area 320 is set with a value of 10 for each of x-coordinates and y-coordinates.

In the case illustrated in FIG. 13, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 306, the scrolling determination part 210 determines that scrolling is to be performed in a direction corresponding to the boundary line 306. In the case illustrated in FIG. 13, since the path of a contact position crosses the boundary line 306 in the direction from the upper right to the lower left of the screen, it is determined that scrolling is to be performed in the lower left direction.

Figure 14:
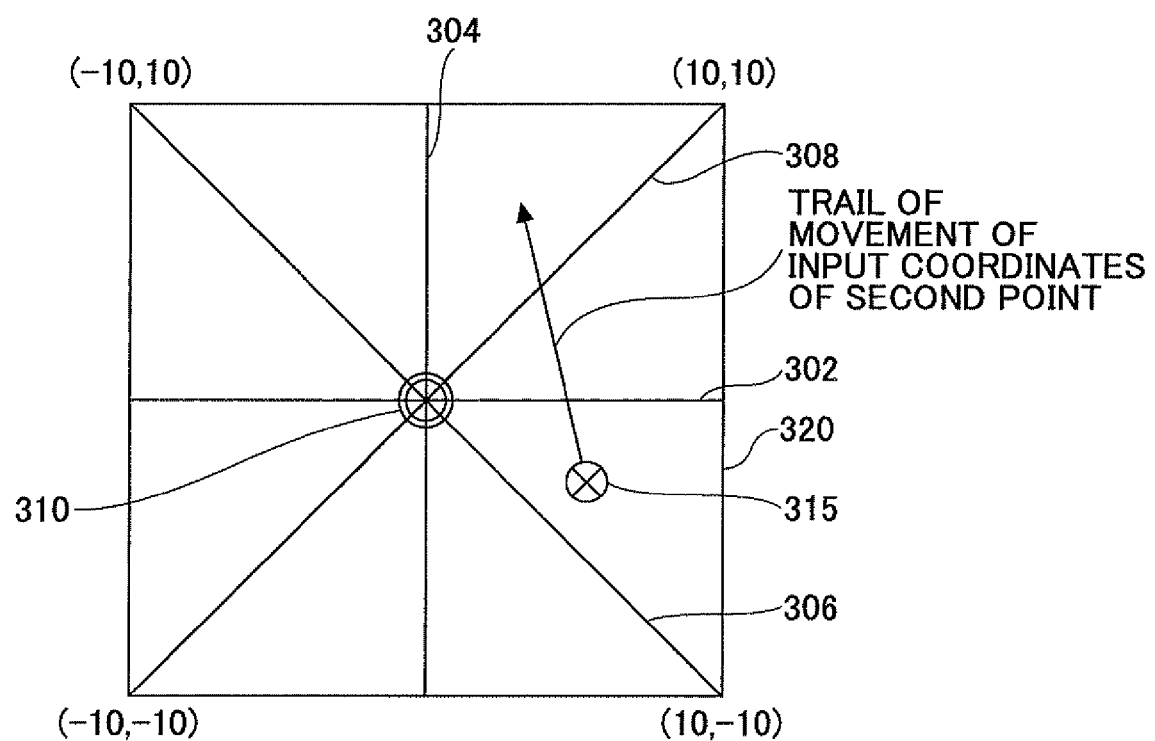
FIG. 14 is another diagram illustrating the scrolling determination in the system of FIG. 1 according to the embodiment of the present invention.

FIG. 14 is another diagram illustrating the scrolling determination.

In the case illustrated in FIG. 14, the check box 350 for using up-down scrolling, the check box 352 for using right-left scrolling, the check box 354 for using upper left-lower right scrolling, and the check box 356 for using upper right-lower left scrolling are checked on the scrolling function setup screen 300 of FIG. 3. Further, the angle of the boundary 302 for determining the up-down scrolling is zero degrees (0°), the angle of the boundary 304 for determining the right-left scrolling is 90 degrees (90°), the angle of the boundary 308 for determining the upper left-lower right scrolling is 45 degrees (45°), and the angle of the boundary 306 for determining the upper right-lower left scrolling is −45 degrees (−45°). Further, the scrolling determination area 320 is set with a value of 10 for each of x-coordinates and y-coordinates.

In the case illustrated in FIG. 14, since the second coordinates 315 are included in the scrolling determination area 320 centered on the first coordinates 310, the input determination part 208 determines that scrolling is requested. The scrolling determination part 210 determines the positional relationship between the first coordinates 310 and the second coordinates 315 and the path of a contact position starting at the second coordinates 315. If the path of a contact position starting at the second coordinates 315 passes the boundary line 302, the scrolling determination part 210 determines that scrolling is to be performed in a direction corresponding to the boundary line 302. In the case illustrated in FIG. 14, since the path of a contact position crosses the boundary line 302 in the direction from the bottom to the top of the screen, it is determined that scrolling is to be performed in the upward direction. Thereafter, if the path of a contact position starting at the second coordinates 315 passes the boundary line 308, the scrolling determination part 210 determines that scrolling is to be performed in a direction corresponding to the boundary line 308. In the case illustrated in FIG. 14, since the path of a contact position crosses the boundary line 308 in the direction from the lower right to the upper left of the screen, it is determined that scrolling is to be performed in the upper left direction.

In this embodiment, the scrolling direction may alternatively be determined based on the second coordinates 315 and the endpoint coordinates of the path of a contact position starting at the second coordinates 315.

Further, in this embodiment, one or more additional boundary lines for determining the scrolling direction may be set. Increasing the number of boundary lines makes it possible to perform scrolling more smoothly.

According to one aspect of the present invention, a touchscreen panel unit capable of detecting multiple contact positions is provided. The touchscreen panel unit includes a scrolling determination part configured to determine whether to scroll a displayable region of information to be displayed on a screen based on the positional relationship between a position of a first contact with the screen and a position of a second contact with the screen, a scrolling setting part configured to set a scrolling direction in which the displayable region is to be scrolled and a scrolling distance over (for) which the displayable region is to be scrolled based on the position of the first contact and a contact position path starting at the position of the second contact, in response to the scrolling determination part determining that the displayable region is to be scrolled, and a scrolling information output part configured to output information indicating the scrolling direction and the scrolling distance set by the scrolling setting part.

By setting the scrolling direction and the scrolling distance of the displayable region based on the position of the first contact and the contact position path starting at the position of the second contact, it is possible to perform scrolling without a display used for scrolling operations on the screen. For example, it is possible to output scrolling with a touchscreen panel, whose entire region may be available for inputting, without providing a scroll bar on the screen.

This touchscreen panel unit operates in the same manner as a common touchscreen panel in the case of an initial (first) touch input. If a second touch input is made after the first touch input while the first touch input is retained, that is, the first touch is maintained on the screen, the touchscreen panel unit fixes the first touch input. The touchscreen panel unit performs scrolling determination based on the input positional relationship. If it is determined that scrolling is to be performed, scrolling coordinates are input to the operating system.

Further, the scrolling setting part may be configured to set the scrolling direction and the scrolling distance of the displayable region in response to the contact position path crossing a boundary line set to pass the position of the first contact.

This makes it possible to determine whether to perform scrolling based on the contact position path and the boundary line.

Further, the scrolling setting part may be configured to set the scrolling direction of the displayable region in a direction to cross the boundary line and to set the scrolling distance of the displayable region to a distance determined based on a traveling distance from the position of the second contact.

It is determined that scrolling is to be performed in the case of the contact position path crossing the boundary line, and it is possible to set the scrolling direction and the scrolling distance of the displayable region based on the contact (touch) positions before and after crossing the boundary line.

Further, the touchscreen panel unit may further include a contact coordinate determination part configured to determine whether the coordinates of the position of the second contact are included in a predetermined area including the coordinates of the position of the first contact. The scrolling determination part may be configured to determine that the displayable region is to be scrolled in response to the contact coordinate determination part determining that the coordinates of the position of the second contact are included in the predetermined area.

It is possible to determine whether to perform scrolling based on whether the coordinates of the position of the second contact are included in a predetermined area including the coordinates of the position of the first contact.

Further, the scrolling setting part may be configured to set the scrolling direction of the displayable region so that the displayable region is scrolled in an upward direction or a downward direction and/or a rightward direction or a leftward direction.

It is possible to perform scrolling in an upward direction or a downward direction and/or a rightward direction or a leftward direction based on the position of the first contact and the contact position path starting at the position of the second contact.

Further, the scrolling setting part may be configured to set the scrolling direction of the displayable region based on the position of the first contact and the contact position path so that the displayable region is scrolled in an oblique direction.

It is possible to perform scrolling in an oblique direction based on the position of the first contact and the contact position path starting at the position of the second contact. This makes it possible to perform scrolling in an oblique direction without combining upward scrolling or downward scrolling and rightward scrolling or leftward scrolling.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

For convenience of description, a unit or apparatus according to the embodiment is described using functional block diagrams. However, such a unit or apparatus may be implemented with hardware, software, or their combination.

What is claimed is:

1. A touchscreen panel unit, comprising:
    a scrolling determination part configured to determine whether boundary line set to pass through a position of a first contact with a screen has been crossed by a path of a position of a second contact with the screen, and to determine to scroll a region of information displayed on the screen in response to determining that the boundary line has been crossed by the path and not to scroll the region of the information displayed on the screen in response to determining that the boundary line has not been crossed by the path, wherein the second contact is made independent of the first contact and the path of the position of the second contact with the screen starts at an initial position of the second contact with the screen;
    a scrolling setting part configured to set a scrolling direction and a scrolling distance of the displayed region of the information in response to the scrolling determination part determining to scroll the displayed region of the information; and
    a scrolling information output part configured to output information indicating the scrolling direction and the scrolling distance set by the scrolling setting part.

2. The touchscreen panel unit as claimed in claim 1, wherein the scrolling setting part is configured to set the scrolling direction of the displayed region of the information in a direction to cross the boundary line and to set the scrolling distance of the displayed region of the information to a distance determined based on a traveling distance from the initial position of the second contact.

3. The touchscreen panel unit as claimed in claim 1, further comprising:
    a contact coordinate determination part configured to determine whether coordinates of the initial position of the second contact are included in a predetermined area including coordinates of the position of the first contact,
    wherein the scrolling determination part is configured to determine whether the boundary line has been crossed by the path in response to the contact coordinate determination part determining that the coordinates of the initial position of the second contact are included in the predetermined area.

4. The touchscreen panel unit as claimed in claim 1, wherein the scrolling setting part is configured to set the scrolling direction of the displayed region of the information so that the displayed region of the information is scrolled in at least one of a vertical direction and a horizontal direction.

5. The touchscreen panel unit as claimed in claim 1, wherein the scrolling setting part is configured to set the scrolling direction of the displayed region of the information based on the position of the first contact and the path so that the displayed region of the information is scrolled in an oblique direction.

6. A scrolling control method, comprising:
    determining whether boundary line set to pass through a position of a first contact with a screen has been crossed by a path of a position of a second contact with the screen, and to determine to scroll a region of information displayed on the screen in response to determining that the boundary line has been crossed by the path and not to scroll the region of the information displayed on the screen in response to determining that the boundary line has not been crossed by the path, wherein the second contact is made independent of the first contact and the path of the position of the second contact with the screen starts at an initial position of the second contact with the screen;

setting a scrolling direction and a scrolling distance of the displayed region of the information in response to determining to scroll the displayed region of the information; and outputting information indicating the scrolling direction and the scrolling distance set by said setting.

7. A non-transitory computer-readable recording medium in which a program is recorded for causing a processor of a computer to execute the scrolling control method as set forth in claim 6.

* * * * *